US012696129B2

(12) United States Patent
Gan et al.

(10) Patent No.: US 12,696,129 B2
(45) Date of Patent: Jul. 28, 2026

(54) VoWiFi SPLIT PDU SESSION HANDOVER

(71) Applicant: Telefonaktiebolaget LM Ericsson (publ), Stockholm (SE)

(72) Inventors: Juying Gan, Shanghai (CN); George Foti, Dollard des Ormeaux (CA); Ralf Keller, Würselen (DE); Chunbo Wang, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 663 days.

(21) Appl. No.: 18/014,486

(22) PCT Filed: Jul. 2, 2021

(86) PCT No.: PCT/IB2021/055973
§ 371 (c)(1),
(2) Date: Jan. 5, 2023

(87) PCT Pub. No.: WO2022/009053
PCT Pub. Date: Jan. 13, 2022

(65) Prior Publication Data
US 2023/0319621 A1    Oct. 5, 2023

(30) Foreign Application Priority Data
Jul. 7, 2020    (WO) ................ PCT/CN2020/100579

(51) Int. Cl.
*H04W 28/02*        (2009.01)
*H04L 65/1016*      (2022.01)
(Continued)

(52) U.S. Cl.
CPC ..... *H04W 28/0268* (2013.01); *H04L 65/1016* (2013.01); *H04L 65/1069* (2013.01); *H04W 36/00226* (2023.05); *H04W 36/144* (2023.05)

(58) Field of Classification Search
CPC ....... H04W 28/0268; H04W 36/00226; H04W 36/144; H04L 65/1016; H04L 65/1069
See application file for complete search history.

(56) References Cited

U.S. PATENT DOCUMENTS

2020/0053603 A1*    2/2020    Huang-Fu ............. H04W 8/183

FOREIGN PATENT DOCUMENTS

WO        2019122988 A1    6/2019

OTHER PUBLICATIONS

LG Electronics, "S2-1909620: Discussion on EPS/RAT fallback for IMS voice over ePDG/N3WIF", 3GPP TSG-SA2 Meeting #135), Oct. 4, 2019 (Year: 2019).*

(Continued)

*Primary Examiner* — Tonia L Dollinger
(74) *Attorney, Agent, or Firm* — Withrow & Terranova, PLLC

(57) ABSTRACT

A Voice Over Wifi (VoWifi) split Protocol Data Unit (PDU) Session handover is provided. In embodiments described herein, a VoWiFi session is established via a Non-3GPP N3IWF over a 5G Core, and a handover to 3GPP access through the 5G System is initiated. During handover and based on local configuration, the Packet Data Network Gateway-Control Plane (PGW-C) and Session Management Function (SMF) (PGW-C+SMF) accepts the PDU Session transfer towards the User Equipment (UE) and Next Generation Radio Access Network (NG-RAN) by means of setting up only the Quality of Service (QoS) Flow associated with a default QoS Rule. The PGW-C+SMF initiates set up of the QoS Flow for Internet Protocol (IP) Multimedia Subsystem (IMS) voice using the PDU Session Modification procedure after the NG-RAN successfully allocates resources for the transferred PDU Session and the confirmation has reached the PGW-C+SMF.

20 Claims, 9 Drawing Sheets

(51) Int. Cl.
    *H04L 65/1069*     (2022.01)
    *H04W 36/00*      (2009.01)
    *H04W 36/14*      (2009.01)

(56)           References Cited

OTHER PUBLICATIONS

Qualcomm et al. "S2-1912644: Use of EPS/RAT fallback for VoWiFi session", 3GPP TSG-SA2 Meeting #136, Nov. 22, 2019 (Year: 2019).*
Author Unknown, "Technical Specification Group Services and System Aspects; Procedures for the 5G System; Stage 2 (Release 16)," Technical Specification 23.502, Version 16.1.1, Jun. 2019, 3GPP Organizational Partners, 495 pages.
Author Unknown, "Technical Specification Group Core Network and Terminals; Non-Access-Stratum (NAS) protocol for 5G System (5GS); Stage 3; (Release 16)," Technical Specification 24.501, Version 16.4.1, Mar. 2020, 3GPP Organizational Partners, 666 pages.
Author Unknown, "Technical Specification Group Radio Access Network; NG-RAN; NG Application Protocol (NGAP) (Release 16)," Technical Specification 38.413, Version 16.1.0, Mar. 2020, 3GPP Organizational Partners, 341 pages.
LG Electronics, "S2-1909620: Discussion on EPS/RAT fallback for IMS voice over ePDG/N3WIF," 3GPP TSG-SA2 Meeting #135, Oct. 14-18, 2019, Split, Croatia, 4 pages.
Qualcomm Incorporated, et al., "S2-1912644: Use of EPS/RAT fallback for VoWifi session," 3GPP TSG-SA2 Meeting #136, Nov. 18-22, 2019, Reno, Nevada, 3 pages.
International Search Report and Written Opinion for International Patent Application No. PCT/IB2021/055973, mailed Sep. 30, 2021, 17 pages.

* cited by examiner

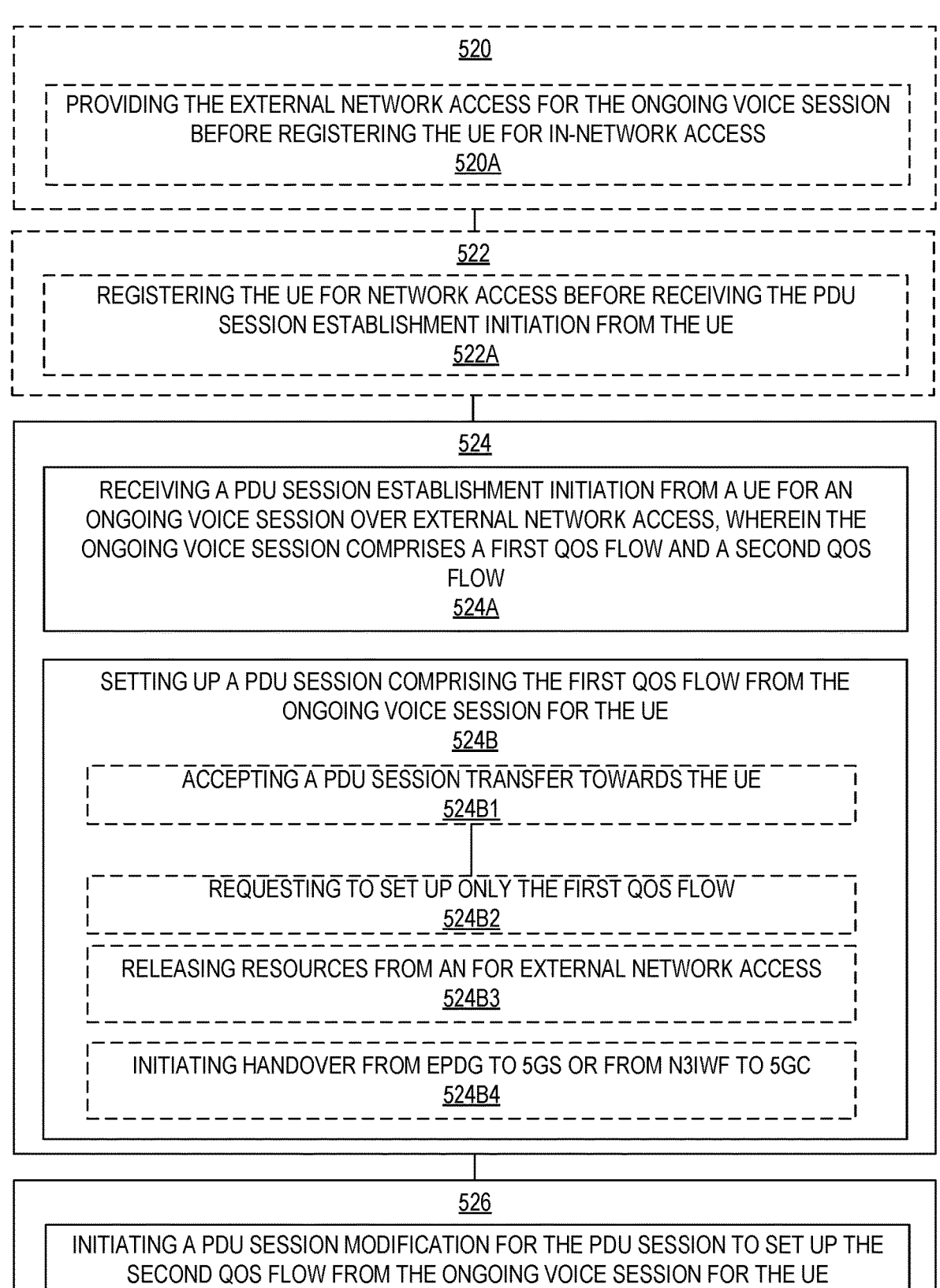

520

PROVIDING THE EXTERNAL NETWORK ACCESS FOR THE ONGOING VOICE SESSION
BEFORE REGISTERING THE UE FOR IN-NETWORK ACCESS
520A

522

REGISTERING THE UE FOR NETWORK ACCESS BEFORE RECEIVING THE PDU
SESSION ESTABLISHMENT INITIATION FROM THE UE
522A

524

RECEIVING A PDU SESSION ESTABLISHMENT INITIATION FROM A UE FOR AN
ONGOING VOICE SESSION OVER EXTERNAL NETWORK ACCESS, WHEREIN THE
ONGOING VOICE SESSION COMPRISES A FIRST QOS FLOW AND A SECOND QOS
FLOW
524A

SETTING UP A PDU SESSION COMPRISING THE FIRST QOS FLOW FROM THE
ONGOING VOICE SESSION FOR THE UE
524B

ACCEPTING A PDU SESSION TRANSFER TOWARDS THE UE
524B1

REQUESTING TO SET UP ONLY THE FIRST QOS FLOW
524B2

RELEASING RESOURCES FROM AN FOR EXTERNAL NETWORK ACCESS
524B3

INITIATING HANDOVER FROM EPDG TO 5GS OR FROM N3IWF TO 5GC
524B4

526

INITIATING A PDU SESSION MODIFICATION FOR THE PDU SESSION TO SET UP THE
SECOND QOS FLOW FROM THE ONGOING VOICE SESSION FOR THE UE
526A

*FIG. 5B*

VoWiFi SPLIT PDU SESSION HANDOVER

RELATED APPLICATIONS

This application is a 35 U.S.C. § 371 national phase filing of International Application No. PCT/IB2021/055973, filed Jul. 2, 2021, which claims the benefit of International Application No. PCT/CN2020/100579, filed Jul. 7, 2020, the disclosures of which are hereby incorporated herein by reference in their entireties.

TECHNICAL FIELD

The present disclosure relates to Protocol Data Unit (PDU) session handover schemes in wireless communications networks.

BACKGROUND

The Fifth Generation (5G) mobile wireless communications system or New Radio (NR) developed by the Third Generation Partnership Project (3GPP) supports a diverse set of use cases and a diverse set of deployment scenarios. Telecommunications systems deploying 5G NR support interoperability with Internet Protocol (IP)-based communications with the IP Multimedia Subsystem (IMS). For example, IMS voice provides support for voice services with non-3GPP systems, such as Voice Over IP (VoIP) or Voice Over WiFi (VoWiFi).

FIG. 1 is a flow diagram illustrating transfer of a Protocol Data Unit (PDU) Session used for IMS voice from non-3GPP access to a 5G System (5GS), reproducing FIG. 4.13.6.3-1 from 3GPP Technical Specification (TS) 23.502. This figure is described in the current version of TS 23.502 section 4.16.6.3, reproduced below:

---

***START 3GPP TS 23.502, SECTION 4.13.6.3***

4.13.6.3    Transfer of PDU Session used for IMS voice from non-3GPP access to 5GS When the UE has an ongoing IMS voice session via non-3GPP access using ePDG or N3IWF, and the session is transferred to NG-RAN, depending on the selected RAT in 5GS (NR or E-UTRA), and the support of EPS/inter-RAT fallback in NG-RAN, either the IMS voice session continues over NG-RAN (E-UTRA) or EPS/inter-RAT fallback is triggered.

Steps 1, 2 and 3 apply to either of the above two cases.

1.    UE has ongoing IMS voice session via non-3GPP access using ePDG or N3IWF. UE is triggered to move to 3GPP access and camps in NG-RAN.

2.    If the UE is not registered via 3GPP access, the UE shall initiate Registration procedure as defined in clause 4.2.2.2.2.

3.    UE initiates PDU Session establishment for the PDU Session used for IMS voice service in order to initiate handover from EPC/ePDG to 5GS as defined in clause 4.11.4.1 step 2 or to initiate handover from N3IWF to 3GPP access in 5GC in step 2 of clauses 4.9.2.1 and 4.9.2.3. The SMF accepts the successful PDU Session transfer to the UE in NAS.

NOTE 1:    If the UE is aware (e.g. implementation-dependent mechanisms) that voice over NR may not be natively supported in the current Registration area, the UE can attempt to move to E-UTRA to initiate a handover of the IMS PDU Session to EPC or 5GC to continue the IMS voice session. The remaining steps are not executed.

4.    NG-RAN may decide to trigger EPS or inter-RAT fallback, taking into account UE capabilities, indication from AMF that "Redirection for EPS fallback for voice is possible" (received as part of initial context setup as defined in TS 38.413 [10]), network configuration (e.g. N26 availability configuration) and radio conditions. NG-RAN may initiate measurement report solicitation from the UE including E-UTRA as target.
If NG-RAN does not trigger EPS or inter-RAT fallback, then the procedure stops here and following steps are not executed.

5.    NG-RAN responds indicating rejection to set up the QoS flow for IMS voice received in step 3 towards the PGW-C+SMF (or H-SMF+P-GW-C via V-SMF, in the case of roaming scenario) via AMF with an indication that mobility due to fallback for IMS voice is ongoing. The PGW-C+SMF reports the EPS Fallback event to the PCF if the PCF has subscribed to this event. The PGW-C+SMF executes the release of resources in non-3GPP AN as specified in clause 4.11.4.1 and clauses 4.9.2.1 and 4.9.2.3.

NOTE 2:    The timing of executing the release of resources in non-3GPP AN will depend on whether NG-RAN decides to trigger EPS or inter-RAT fallback but will take place at least after step 5.
If EPS fallback is triggered steps 5-7 from clause 4.13.6.1 are executed. If inter-RAT Fallback for IMS voice is triggered steps 5-6 from clause 4.13.6.2 are executed.

***END 3GPP TS 23.502, SECTION 4.13.6.3***

---

Based on the above current version of TS 23.502 section 4.13.6.3, when a VoWiFi session is established (e.g., via a Non-3GPP Interworking Function (N3IWF) over a 5G Core (5GC), via an Evolved Packet Data Gateway (ePDG) over an Evolved Packet Core (EPC), etc.), and a handover to 3GPP access through the 5GS/NR is required (e.g., due to loss of WiFi coverage), a User Equipment (UE) can attempt a PDU Session handover to 3GPP access (e.g., NR). However, if Voice Over New Radio (VoNR) is not supported, the Radio Access Network (RAN) will reject the voice Quality of Service (QoS) Flow, and accepts only the Session Initiation Protocol (SIP) signaling QoS Flow. Hence the RAN attempts to establish radio resources with the UE just for the SIP signaling bearer. However, at the same time the UE receives a PDU Session Accepted response for both QoS Flows from the Session Management Function (SMF) at the Non-Access Stratum (NAS) layer.

It is important to note that the UE only includes the PDU Session identity/identifier (ID) for a NAS PDU establishment request that transfers a session from non-3GPP access to 3GPP access in accordance with TS 24.501 section 6.4.2.1, hence the UE cannot selectively transfer a subset of the QoS Flows of a PDU Session. Quoted from TS 24.501:

---

***START EXCERPT FROM 3GPP TS 24.501***
If:
 a) the UE requests to perform handover of an
    existing PDU Session between 3GPP access
    and non-3GPP access;
 b) the UE requests to perform transfer an
    existing PDN connection in the EPS
    to the 5GS; or
 c) the UE requests to perform transfer
    an existing PDN connection in an untrusted
    non-3GPP access connected to the EPC to the 5GS;
the UE shall:
 a) set the PDU Session ID in the PDU SESSION ESTABLISHMENT
    REQUEST message and in the UL NAS TRANSPORT
    message to the stored PDU Session ID
    corresponding to the PDN connection.
      ***END EXCERPT FROM 3GPP TS 24.501***

---

There currently exist certain challenges. The current behavior in section 4.13.6.3 of TS 23.502 is unclear about the behavior of the UE and the SMF under circumstances where only a subset of the QoS Flows of a PDU session are successfully transferred, and the UE and the SMF view given the NAS session state and the RAN state are different (i.e., the UE believes the SMF accepted all the QoS Flows in a PDU Session Establishment Accept message, but in fact the SMF accepted only a subset of those QoS Flows), leading to interoperability issues. Moreover, the current solution in 3GPP requires new support in the RAN to trigger an Evolved Packet System (EPS) Fallback/Radio Access Technology (RAT) Fallback based on an incoming PDU Session establishment request and not on a PDU Session modification request as so far standardized with EPS Fallback/RAT Fallback.

SUMMARY

One example aspect of the present disclosure is directed to a method performed by a network node for performing handover of a Protocol Data Unit (PDU) Session. The method includes receiving a PDU Session establishment initiation from a User Equipment (UE) for an ongoing voice session over external network access, wherein the ongoing voice session comprises a first Quality of Service (QoS) flow and a second QoS flow. The method includes setting up a PDU Session comprising the first QoS flow from the ongoing voice session for the UE. The method includes initiating a PDU Session modification for the PDU session to set up the second QoS flow from the ongoing voice session for the UE.

In some embodiments, the method further includes registering the UE for network access before receiving the PDU Session establishment initiation from the UE. In some embodiments, the method further includes providing the external network access for the ongoing voice session before registering the UE for in-network access.

In some embodiments, initiating the PDU Session modification results in a Radio Access Technology (RAT) fallback for the second QoS flow.

In some embodiments, the first QoS flow includes a Session Initiation Protocol (SIP) QoS flow and the second QoS flow includes a Voice over Internet Protocol (VoIP) QoS flow.

In some embodiments, the network node includes a Session Management Function (SMF). In some embodiments, setting up the PDU Session includes accepting a PDU session transfer towards the UE and requesting to set up only the first QoS flow.

In some embodiments, requesting to set up only the first QoS flow includes requesting to set up only the first QoS flow based on a local configuration of a Radio Access Network (RAN) serving the UE.

In some embodiments, the first QoS flow is a QoS flow associated with a default QoS rule in the RAN.

In some embodiments, the local configuration of the RAN is restricted to handover from an Evolved Packet Data Gateway (ePDG) to a Fifth Generation (5G) System (5GS) or handover from Non-Third Generation Partnership Project (3GPP) Interworking Function (N3IWF) to 3GPP access in a 5G Core (5GC).

In some embodiments, the local configuration of the RAN is restricted to roaming cases.

In some embodiments, the network node is a 3GPP 5GC network node. In some embodiments, the ongoing voice session is an Internet Protocol Multimedia Subsystem (IMS) voice session over non-3GPP access using an Evolved Packet Data Gateway (ePDG). In some embodiments, the ongoing voice session is an Internet Protocol Multimedia Subsystem (IMS) voice session over non-3GPP access using a Non-3GPP Interworking Function (N3IWF).

In some embodiments, the network node includes a Packet Data Gateway (PGW) Control Plane (PGW-C) and Session Management Function (SMF) (PGW-C+SMF).

In some embodiments, the second QoS flow has a more stringent QoS requirement than the first QoS flow.

In some embodiments, setting up the PDU Session includes initiating a handover from an ePDG to a 5GS or a handover from a N3IWF to 3GPP access in a 5GC.

In some embodiments, initiating the PDU Session modification results in an Evolved Packet System (EPS) Fallback or an inter-Radio Access Technology (RAT) Fallback for the second QoS flow.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 5B depicts a data flow diagram for one or more steps of the flow diagram illustrating transfer of the PDU session of FIG. 5A according to some embodiments of the present disclosure;

DETAILED DESCRIPTION

Figure 1:
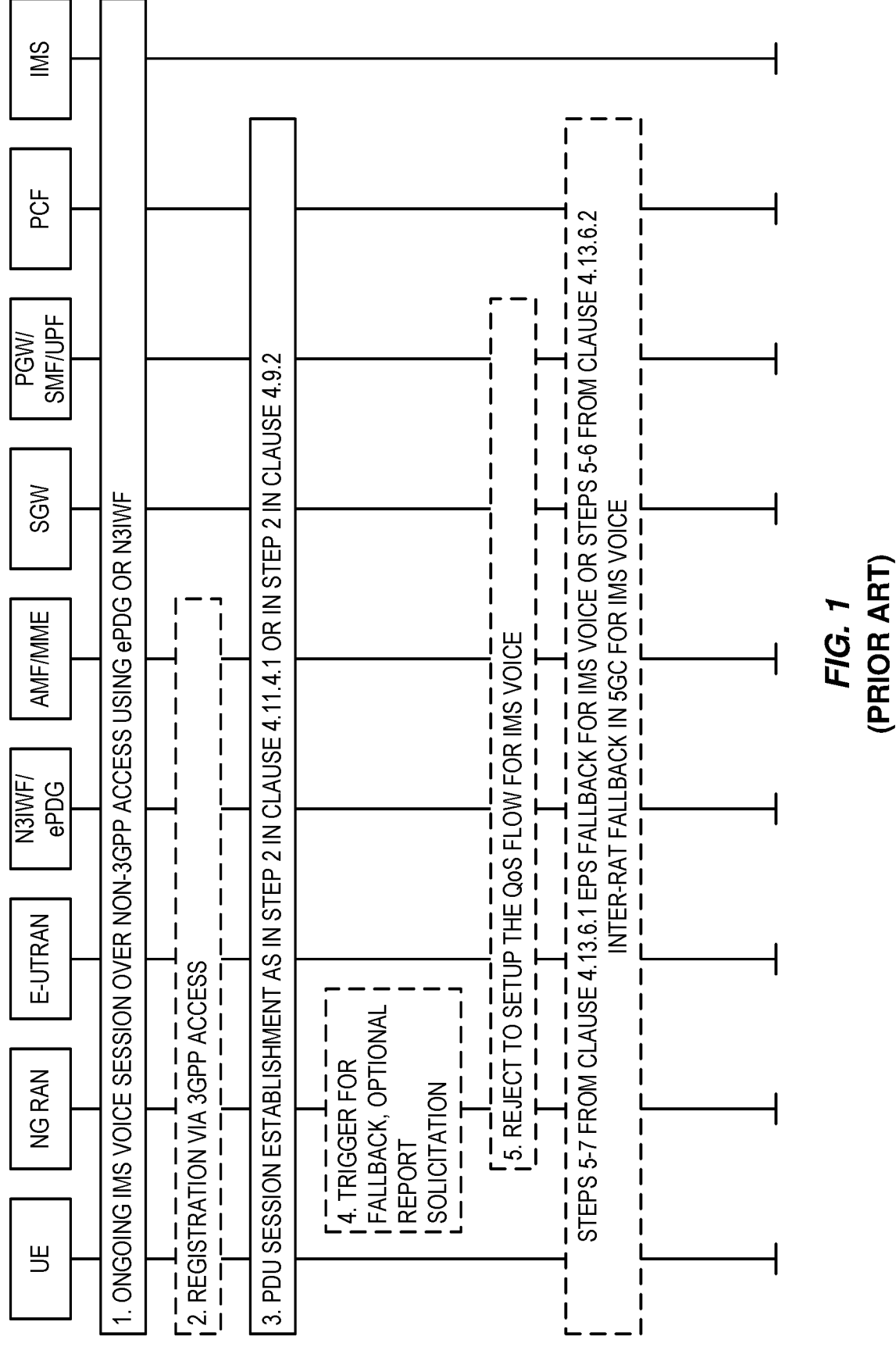
FIG. 1 is a flow diagram illustrating transfer of a Protocol Data Unit (PDU) Session used for Internet Protocol (IP) Multimedia Subsystem (IMS) voice from non-Third Generation Partnership Project (3GPP) access to a Fifth Generation (5G) System (5GS), reproducing FIG. 4.13.6.3-1 from 3GPP Technical Specification (TS) 23.502.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: a mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 2:
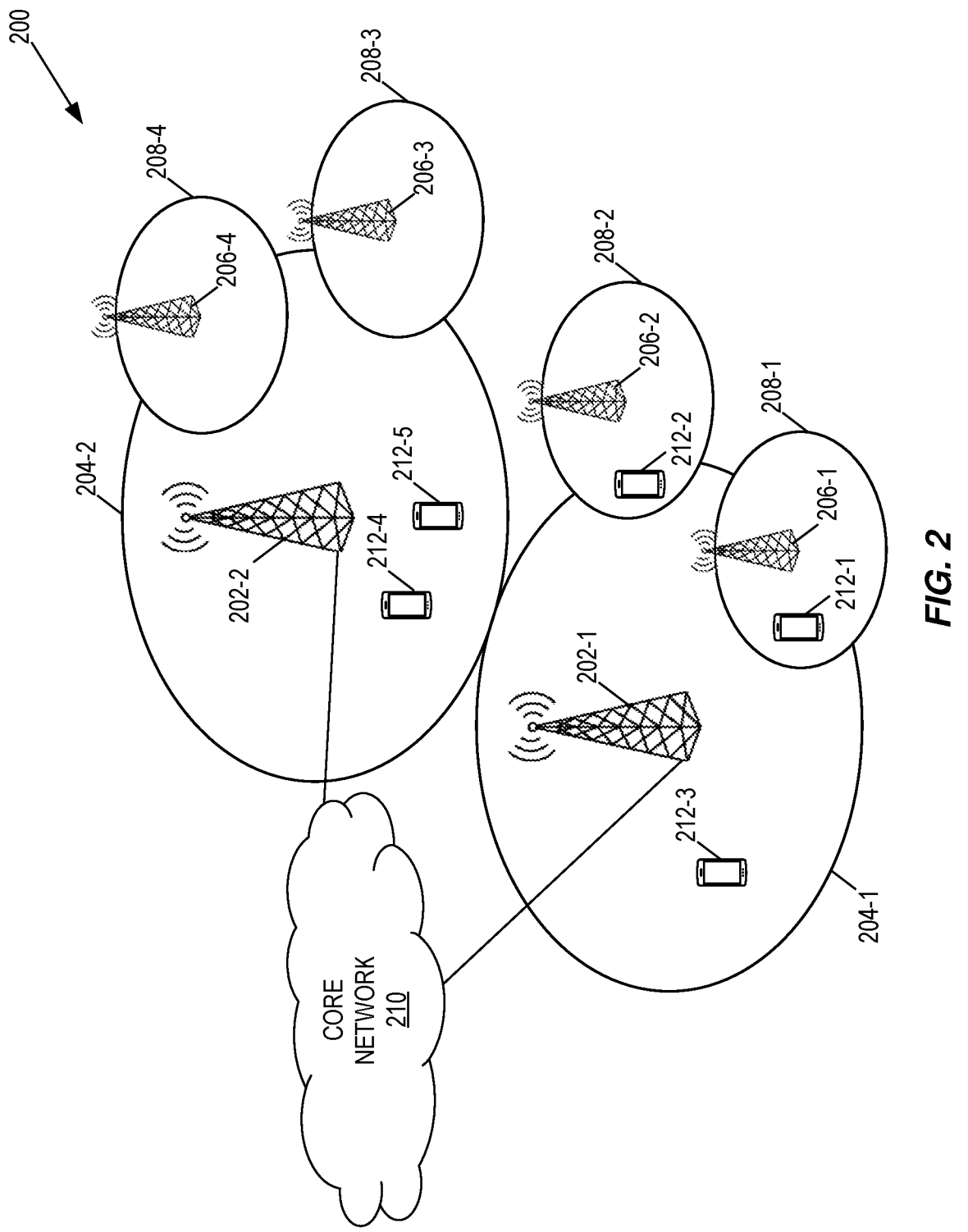
FIG. 2 illustrates one example of a cellular communications system according to some embodiments of the present disclosure.

FIG. 2 illustrates one example of a cellular communications system 200 in which embodiments of the present disclosure may be implemented. In the embodiments described herein, the cellular communications system 200 is a 5G system (5GS) including a Next Generation RAN (NG-RAN) and a 5G Core (5GC). In this example, the RAN includes base stations 202-1 and 202-2, which in the 5GS include NR base stations (gNBs) and optionally next generation eNBs (ng-eNBs) (e.g., LTE RAN nodes connected to the 5GC), controlling corresponding (macro) cells 204-1 and 204-2. The base stations 202-1 and 202-2 are generally referred to herein collectively as base stations 202 and individually as base station 202. Likewise, the (macro) cells 204-1 and 204-2 are generally referred to herein collectively as (macro) cells 204 and individually as (macro) cell 204. The RAN may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The cellular communications system 200 also includes a core network 210, which in the 5GS is referred to as the 5GC. The base stations 202 (and optionally the low power nodes 206) are connected to the core network 210.

The base stations 202 and the low power nodes 206 provide service to wireless communication devices 212-1 through 212-5 in the corresponding cells 204 and 208. The wireless communication devices 212-1 through 212-5 are generally referred to herein collectively as wireless communication devices 212 and individually as wireless communication device 212. In the following description, the wireless communication devices 212 are oftentimes UEs, but the present disclosure is not limited thereto.

Figure 3:
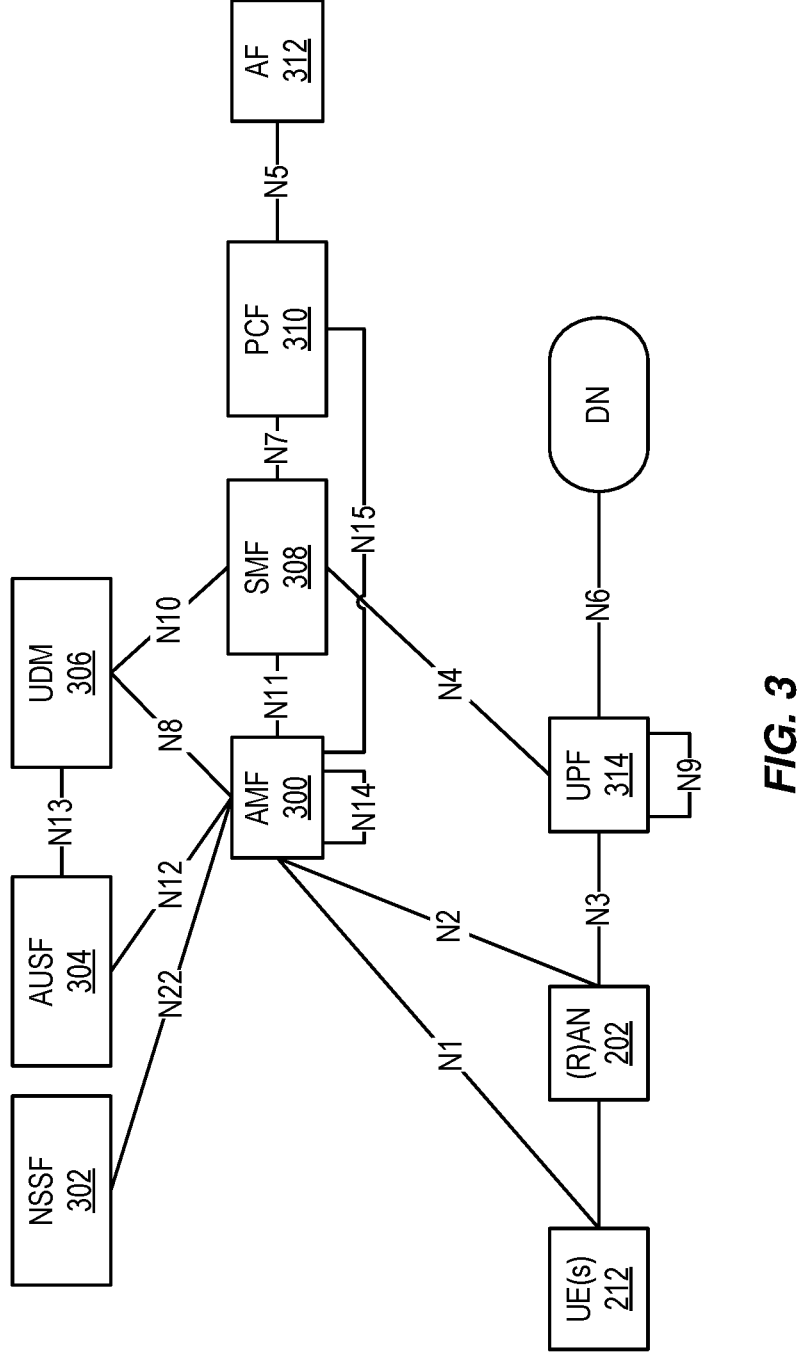
FIG. 3 illustrates a wireless communication system represented as a 5G network architecture composed of core Network Functions (NFs), where interaction between any two NFs is represented by a point-to-point reference point/interface according to some embodiments of the present disclosure.

FIG. 3 illustrates a wireless communication system represented as a 5G network architecture composed of core Network Functions (NFs), where interaction between any two NFs is represented by a point-to-point reference point/interface. FIG. 3 can be viewed as one particular implementation of the cellular communications system 200 of FIG. 2.

Seen from the access side, the 5G network architecture shown in FIG. 3 comprises a plurality of UEs 212 connected to either a RAN 202 or an Access Network (AN) as well as an AMF 300. Typically, the R(AN) 202 comprises base stations, e.g. such as eNBs or gNBs or similar. Seen from the core network side, the 5GC NFs shown in FIG. 3 include a NSSF 302, an AUSF 304, a UDM 306, the AMF 300, a SMF 308, a PCF 310, and an Application Function (AF) 312.

Reference point representations of the 5G network architecture are used to develop detailed call flows in the normative standardization. The N1 reference point is defined to carry signaling between the UE 212 and AMF 300. The reference points for connecting between the AN 202 and AMF 300 and between the AN 202 and UPF 314 are defined as N2 and N3, respectively. There is a reference point, N11, between the AMF 300 and SMF 308, which implies that the SMF 308 is at least partly controlled by the AMF 300. N4 is used by the SMF 308 and UPF 314 so that the UPF 314 can be set using the control signal generated by the SMF 308, and the UPF 314 can report its state to the SMF 308. N9 is the reference point for the connection between different UPFs 314, and N14 is the reference point connecting between different AMFs 300, respectively. N15 and N7 are defined since the PCF 310 applies policy to the AMF 300 and SMF 308, respectively. N12 is required for the AMF 300 to perform authentication of the UE 212. N8 and N10 are defined because the subscription data of the UE 212 is required for the AMF 300 and SMF 308.

The 5GC network aims at separating User Plane (UP) and Control Plane (CP). The UP carries user traffic while the CP carries signaling in the network. In FIG. 3, the UPF 314 is in the UP and all other NFs, i.e., the AMF 300, SMF 308, PCF 310, AF 312, NSSF 302, AUSF 304, and UDM 306, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round Trip Time (RTT) between UEs and data network for some applications requiring low latency.

The 5GC network architecture is composed of modularized functions. For example, the AMF 300 and SMF 308 are independent functions in the CP. Separated AMF 300 and SMF 308 allow independent evolution and scaling. Other CP functions like the PCF 310 and AUSF 304 can be separated as shown in FIG. 3. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 4:
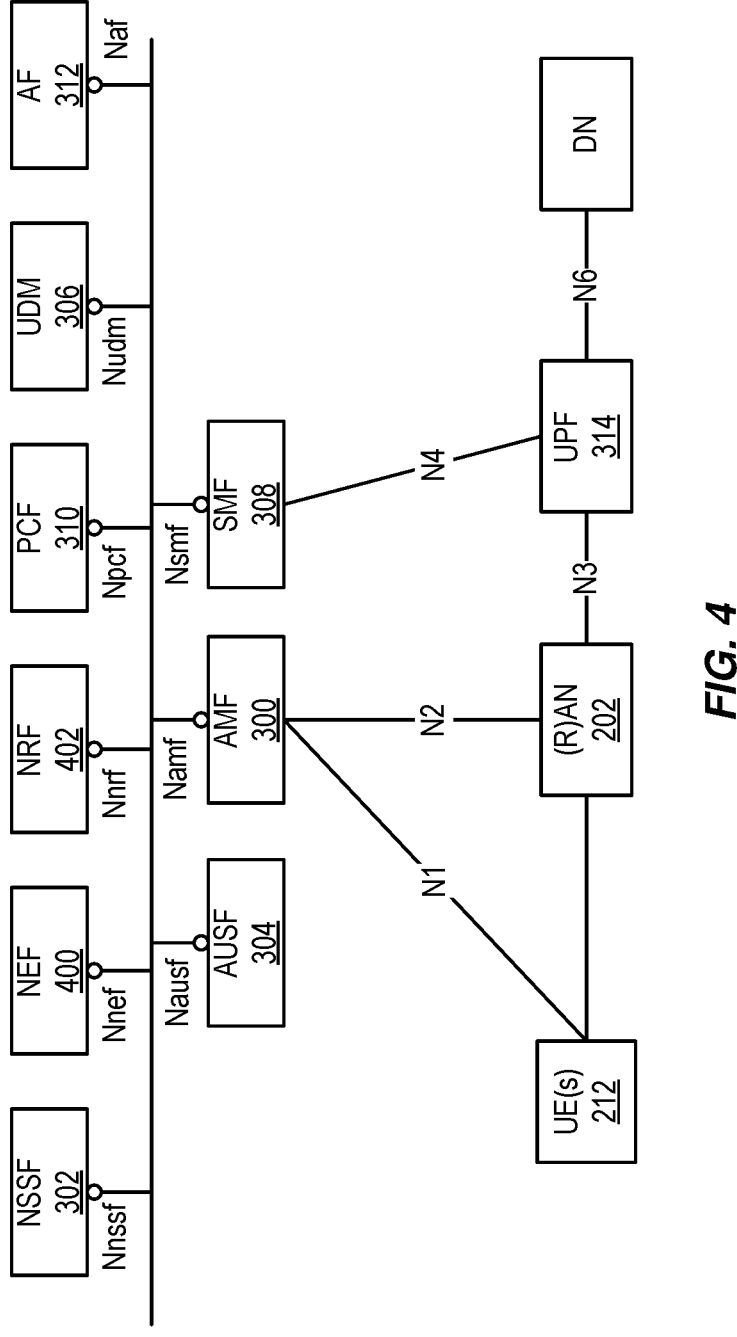
FIG. 4 illustrates a 5G network architecture using service-based interfaces between the NFs in the Control Plane (CP), instead of the point-to-point reference points/interfaces used in the 5G network architecture of FIG. 3, according to some embodiments of the present disclosure.

FIG. 4 illustrates a 5G network architecture using service-based interfaces between the NFs in the CP, instead of the point-to-point reference points/interfaces used in the 5G network architecture of FIG. 3. However, the NFs described above with reference to FIG. 3 correspond to the NFs shown in FIG. 4. The service(s) etc. that a NF provides to other authorized NFs can be exposed to the authorized NFs through the service-based interface. In FIG. 4 the service based interfaces are indicated by the letter "N" followed by the name of the NF, e.g. Namf for the service based interface of the AMF 300 and Nsmf for the service based interface of the SMF 308, etc. The NEF 400 and the NRF 402 in FIG.

4 are not shown in FIG. 3 discussed above. However, it should be clarified that all NFs depicted in FIG. 3 can interact with the NEF 400 and the NRF 402 of FIG. 4 as necessary, though not explicitly indicated in FIG. 3.

Some properties of the NFs shown in FIGS. 3 and 4 may be described in the following manner. The AMF 300 provides UE-based authentication, authorization, mobility management, etc. A UE 212 even using multiple access technologies is basically connected to a single AMF 300 because the AMF 300 is independent of the access technologies. The SMF 308 is responsible for session management and allocates Internet Protocol (IP) addresses to UEs. It also selects and controls the UPF 314 for data transfer. If a UE 212 has multiple sessions, different SMFs 308 may be allocated to each session to manage them individually and possibly provide different functionalities per session. The AF 312 provides information on the packet flow to the PCF 310 responsible for policy control in order to support Quality of Service (QoS). Based on the information, the PCF 310 determines policies about mobility and session management to make the AMF 300 and SMF 308 operate properly. The AUSF 304 supports authentication function for UEs or similar and thus stores data for authentication of UEs or similar while the UDM 306 stores subscription data of UE 212. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g. a cloud infrastructure.

Figure 5A:
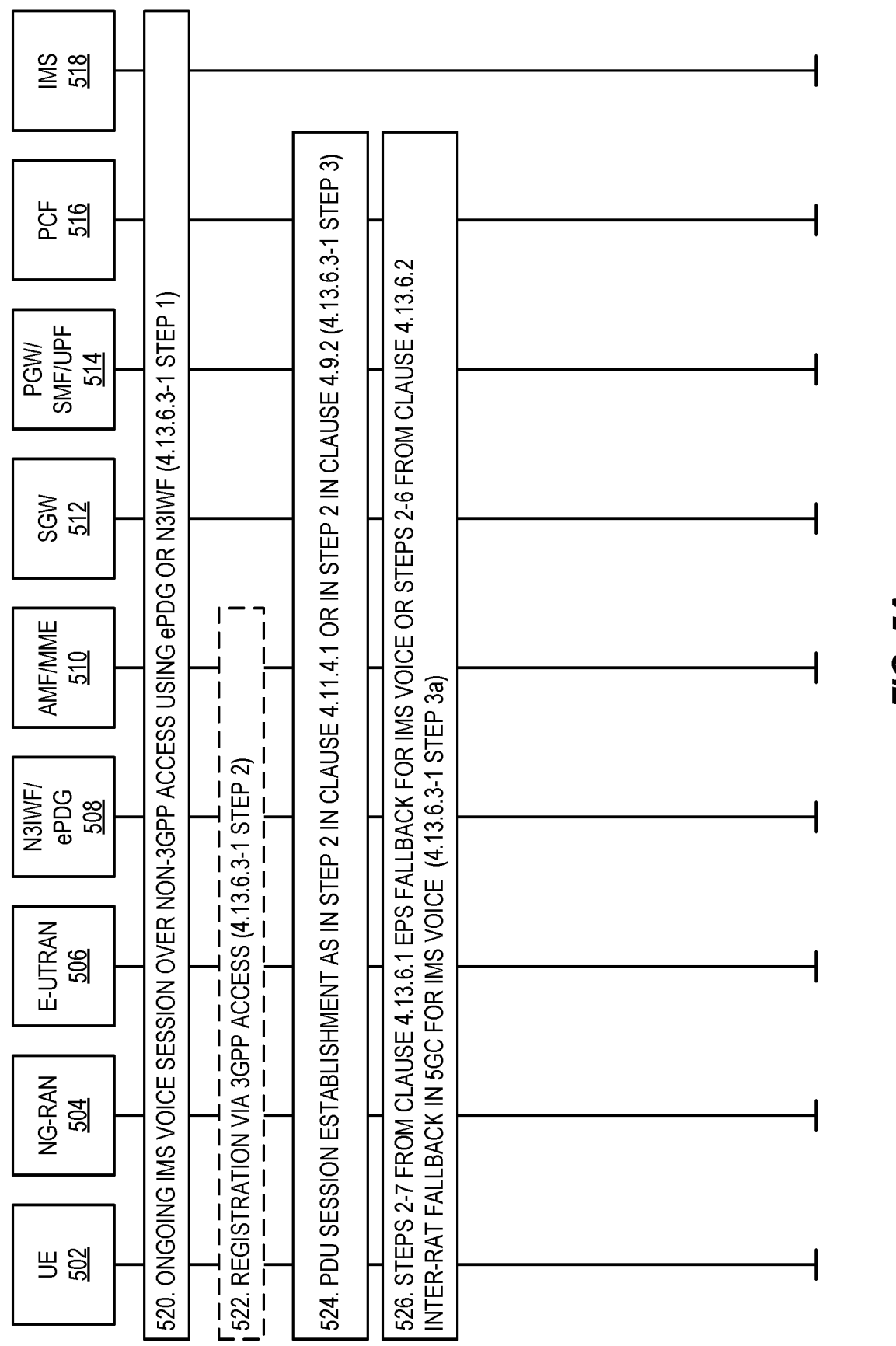
FIG. 5A is a flow diagram illustrating transfer of a PDU Session used for IMS voice from non-3GPP access to a 5GS according to embodiments of the present disclosure, revising FIG. 4.13.6.3-1 from 3GPP TS 23.502.

FIG. 5A is a flow diagram illustrating transfer of a Protocol Data Unit (PDU) Session used for IP Multimedia Subsystem (IMS) voice from non-3GPP access to a 5GS according to embodiments here, revising FIG. 4.13.6.3-1 from 3GPP Technical Specification (TS) 23.502. More specifically, FIG. 5A illustrates a data flow performed by a network node across UE 502, Next-Generation Radio Access Network (NG-RAN) 504, E-UTRAN 506, Non-3GPP Interworking Function (N3IWF)/Evolved Packet Data Gateway (ePDG) 508, AMF/MME 510, Serving Gateway (SGW) 512, PGW/SMF/UPF 514, PCF 516, and/or Internet Protocol Multimedia Subsystem (IMS) 518. In some embodiments, the network node includes a SMF. Alternatively, or additionally, in some embodiments, the network node is a 3GPP 5G core network node. In some embodiments, the network node includes a PGW Control Plane (PGW-C) and Session Management Function (SMF) PGW-C+SMF 514.

Embodiments described herein provide handover of a PDU Session from an ongoing voice session over external network access (e.g., non-3GPP access) to in-network access (e.g., 3GPP access), where the ongoing voice session includes at least a first QoS flow (e.g., a Session Initiation Protocol QoS flow) and a second QoS flow (e.g., a Voice Over IP (VoIP) QoS flow). A split handover is performed, in which an initial PDU session is set up with the first QoS flow, then the PDU session is modified to set up the second QoS flow. In some embodiments, section 4.16.3 of TS 23.502 is revised as described below with reference to FIG. 5A.

At step 520, a Voice Over WiFi (VoWiFi) session can be established via a N3IWF over a 5GC, and a handover to the 5GS is required. For example, a UE 502 (e.g., wireless communication device 212) has an ongoing IMS 518 voice session via non-3GPP access, provided using an Evolved Packet Data Gateway (ePDG) or N3IWF 508.

Turning to FIG. 5B, step 520 of FIG. 5A may optionally include step 520A of FIG. 5B. Step 520A includes providing the external network access for the ongoing voice session before registering the UE 502 for in-network access. In some embodiments, the ongoing voice session is an IMS (e.g., IMS 518) voice session over non-3GPP access using an ePDG (e.g., N3IWF/ePDG 508). Alternatively, in some embodiments, the ongoing voice session is an IMS over non-3GPP access using a N3IWF (e.g., N3IWF/ePDG 508).

Returning to FIG. 5A, at step 522, optionally, if the UE 502 is not registered via 3GPP access, the UE 502 initiates registration with the cellular communications system (e.g., cellular communications system 200 of FIG. 2, etc.). In some examples, Voice Over NR (VoNR) is not supported in the area where the UE 502 is registered (or registering). If the UE 502 is aware that VoNR is not supported, the UE can attempt to move to E-UTRA (e.g., during the registration procedure) to initiate a handover of the IMS PDU session to the EPC or 5GC to continue the IMS 518 voice session.

Turning to FIG. 5B, step 522 of FIG. 5A may optionally include step 522A of FIG. 5B. Step 520A includes registering the UE 502 for network access before receiving the PDU session establishment initiation from the UE 502.

Returning to FIG. 5A, at step 524, the UE 502 initiates PDU Session establishment in order to initiate handover from the EPC or ePDG to the 5GS. During handover, the P-GW-Control Plane (PGW-C) and SMF (PGW-C+SMF) 514 splits PDU session establishment by accepting the PDU Session transfer towards the UE 502 and NG-RAN 504 and (based on local configuration) requesting to set up only the QoS Flow associated with the default QoS Rule in the NG-RAN 504. In some examples, the local configuration in the PGW-C+SMF 514 is applicable only for scenarios where the UE 502 initiates handover from an existing non-3GPP access PDU Session or Packet Data Network (PDN) connection. In some examples, the configuration is restricted to roaming cases.

Turning to FIG. 5B, step 524 of FIG. 5A includes step 524A and step 524B of FIG. 5B. Step 524A includes receiving a PDU session establishment initiation from the UE 502 for an ongoing voice session over external network access. The ongoing voice session includes a first QoS flow and a second QoS flow. Step 524B includes setting up a PDU session that includes the first QOS flow from the voice session for the UE. In some embodiments, the second QoS flow has a more stringent QoS requirement than the first QoS flow.

Additionally, or alternatively, in some embodiments, step 524B includes, at step 524B1, accepting a PDU session transfer towards the UE 502, and at step 524B2, requesting to set up only the first QoS flow. In some embodiments, requesting to set up only the first QoS flow includes requesting to set up only the first QoS flow based on a local configuration of a RAN serving the UE.

In some embodiments, the local configuration is restricted to roaming cases. Additionally, or alternatively, in some embodiments, the local configuration is restricted to handover from an ePDG (e.g., N3IWF/ePDG 508) to a 5GS, or handover from N3IWF (e.g., N3IWF/ePDG 508) to 3GPP access in a 5GC.

Additionally, or alternatively, in some embodiments, step 524B includes, at step 524B3, releasing resources from an access network for the external network access.

Additionally, or alternatively, in some embodiments, step 524B includes, at step 524B4, initiating handover from an ePDG (e.g., N3IWF/ePDG 508) to a 5GS, or a handover from a N3IWF (e.g., n3IWF/ePDG 508) to 3GPP access in a 5GC. In some embodiments, the first QoS flow is a QoS flow associated with a default QoS rule in the RAN.

Returning to FIG. 5A, at step 526, after the PGW-C+SMF 514 confirms that the NG-RAN 504 has successfully allocated resources for the transferred PDU Session, the PGW-C+SMF 514 triggers a PDU Session Modification procedure to initiate set up of the QoS Flow for IMS 518 voice.

Turning to FIG. 5B, step 526 of FIG. 5A includes step 526A of FIG. 5B. Step 526A includes initiating a PDU session modification for the PDU session to set up the second QoS flow from the ongoing voice session for the UE. In some embodiments, initiating the PDU session modification results in a Radio Access Technology (RAT) fallback for the second QoS flow. In some embodiments, the first QoS flow includes a Session Initiation Protocol (SIP) QoS flow, and the second QoS flow includes a VOIP QoS flow. In some embodiments, initiating the PDU session modification at step 526A results in an Evolved Packet System (EPS) fallback or an inter-RAT fallback for the second QoS flow.

Returning to FIG. 5A, with continuing reference to FIG. 5A, a modified version of TS 23.502 section 4.16.6.3 is produced below:

(ASICs), Field Programmable Gate Arrays (FPGAs), and/or the like), memory 606, and a network interface 608. The one or more processors 604 are also referred to herein as processing circuitry. In addition, if the network node 600 is a radio access node, the network node 600 may include one or more radio units 610 that each includes one or more transmitters 612 and one or more receivers 614 coupled to one or more antennas 616. The radio units 610 may be referred to or be part of radio interface circuitry. In some embodiments, the radio unit(s) 610 is external to the control system 602 and connected to the control system 602 via, e.g., a wired connection (e.g., an optical cable). However, in some other embodiments, the radio unit(s) 610 and potentially the antenna(s) 616 are integrated together with the control system 602. The one or more processors 604 operate to provide one or more functions of a network node 600 as described herein (e.g., one or more functions of a NG-RAN base station, a E-UTRAN base station, a MME, an AMF, an SMF, etc. described herein, e.g., with respect to FIG. 5). In some embodiments, the function(s) are implemented in software that is stored, e.g., in the memory 606 and executed by the one or more processors 604.

---

\*\*\*\*\*START MODIFIED 3GPP TS 23.502, SECTION 4.13.6.3\*\*\*\*\*
4.13.6.3      Transfer of PDU Session used for IMS 518 voice from non-
3GPP access to 5GS
When the UE 502 has an ongoing IMS 518 voice session via non-3GPP access using ePDG or N3IWF 508, and the session is transferred to NG-RAN 504, depending on the selected RAT in 5GS (NR or E-UTRA), and the support of EPS/inter-RAT fallback in NG-RAN 504, either the IMS 518 voice session continues over NG-RAN 504 (E-UTRA) or EPS/inter-RAT fallback is triggered.
Steps 1, 2 and 3 apply to either of the above two cases.
    1.        UE 502 has ongoing IMS 518 voice session via non-3GPP access using ePDG
              or N3IWF 508. UE 502 is triggered to move to 3GPP access and camps in
              NG-RAN 504.
    2.        If the UE 502 is not registered via 3GPP access, the UE 502 shall initiate
              Registration procedure as defined in clause 4.2.2.2.2.
    NOTE 1:    If the UE 502 is aware (e.g. implementation-dependent mechanisms)
              that voice over NR may not be natively supported in the current
              Registration area, the UE 502 can attempt to move to E-UTRA to initiate
              a handover of the IMS 518 PDU Session to EPC or 5GC to continue the
              IMS 518 voice session. The remaining steps are not executed.
    3.        UE 502 initiates PDU Session establishment for the PDU Session used for IMS
              518 voice service in order to initiate handover from EPC/ePDG to 5GS as
              defined in clause 4.11.4.1 step 2 or to initiate handover from N3IWF to 3GPP
              access in 5GC in step 2 of clauses 4.9.2.1 and 4.9.2.3. The SMF accepts the
              successful PDU Session transfer towards the UE 502 and based on local
              configuration requests to set up only the QoS Flow associated with the default
              QOS Rule in NG-RAN 504. The PGW-C+SMF 514 executes the release of
              resources in non-3GPP AN as specified in clause 4.11.4.1 and clauses 4.9.2.1
              and 4.9.2.
    NOTE 2:    The local configuration can be restricted to handover from EPC/ePDG to
              5GS or N3IWF to 3GPP access in 5GC. The configuration can also be
              restricted to roaming cases.
    3a.       The PGW-C+SMF 514 triggers PDU Session Modification procedure to set up
              the QoS Flow for IMS voice resulting in EPS FB or inter-RAB Fallback.
              \*\*\*\*\*END MODIFIED 3GPP TS 23.502, SECTION 4.13.6.3\*\*\*\*\*

---

Figure 6:
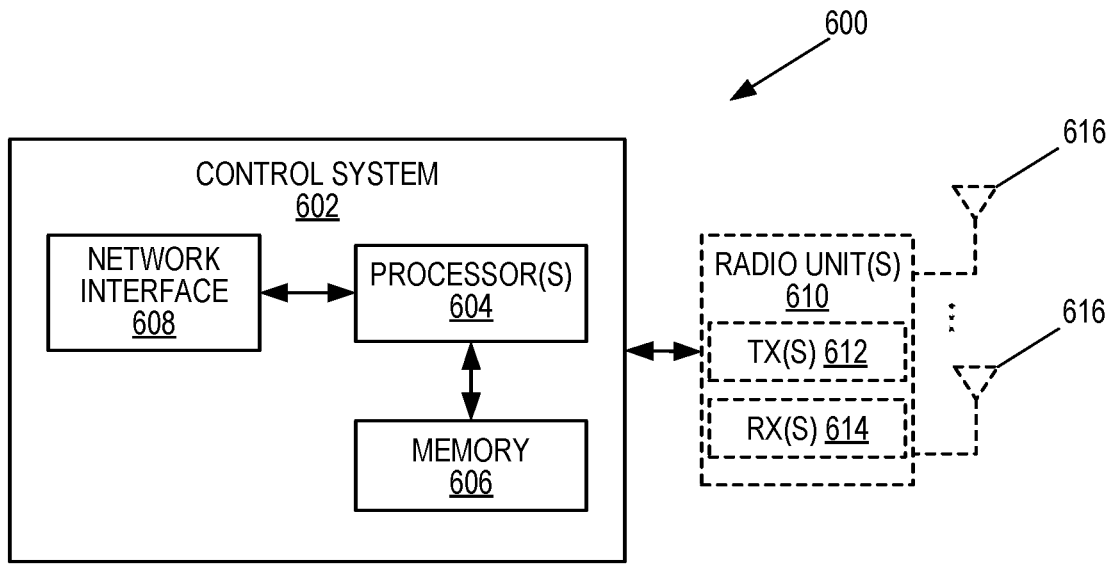
FIG. 6 is a schematic block diagram of a network node according to some embodiments of the present disclosure.
Figure 7:
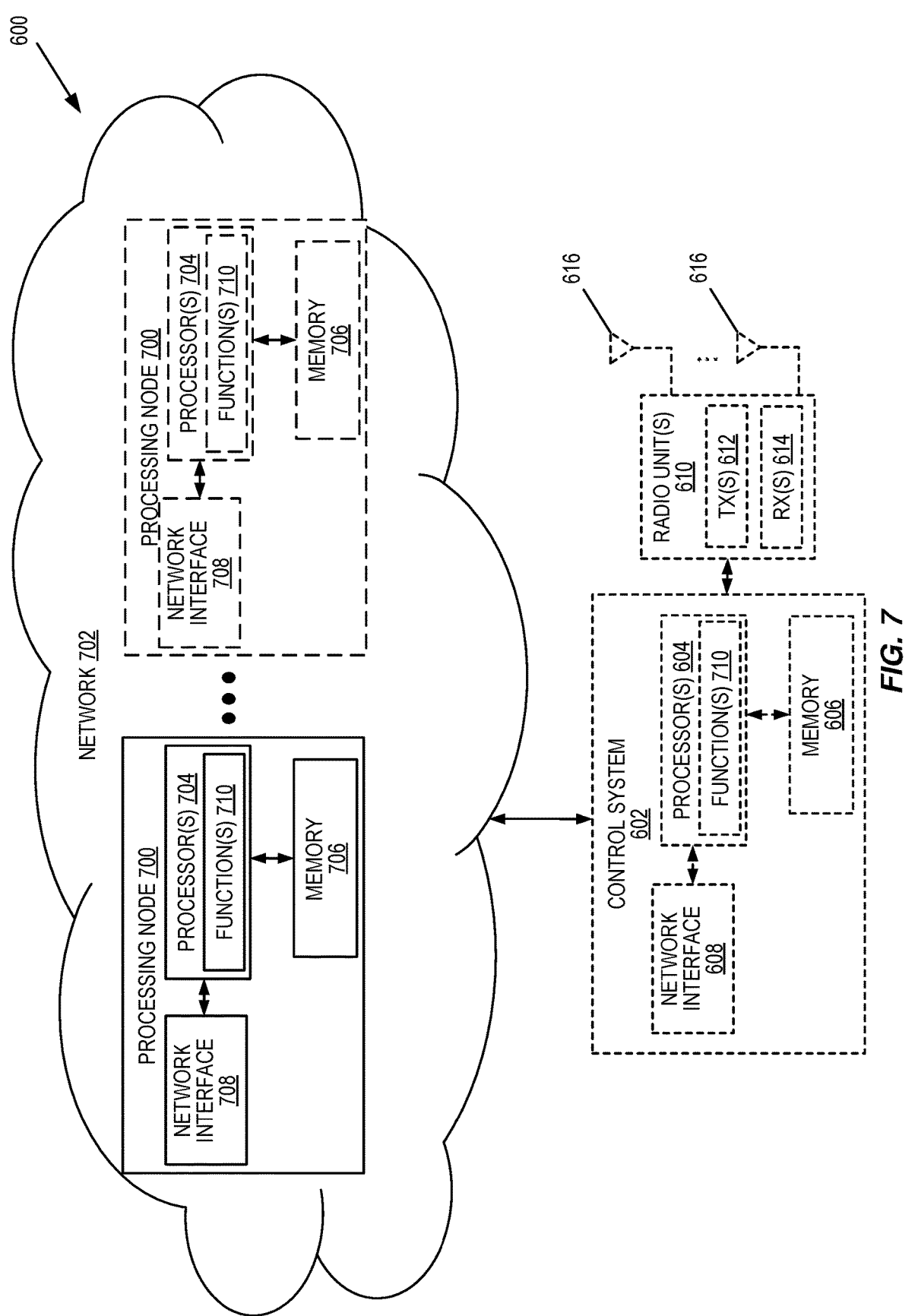
FIG. 7 is a schematic block diagram that illustrates a virtualized embodiment of the network node of FIG. 6 according to some embodiments of the present disclosure.
Figure 9:
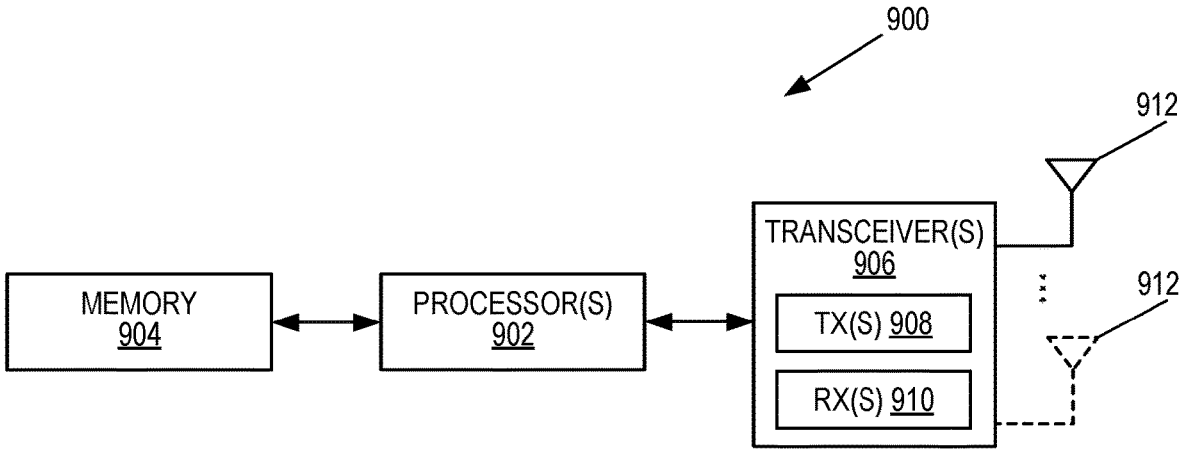
FIG. 9 is a schematic block diagram of a User Equipment (UE) device according to some embodiments of the present disclosure.
Figure 10:
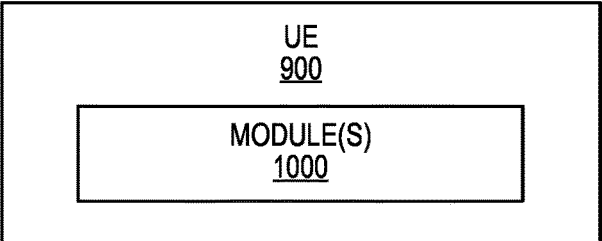
FIG. 10 is a schematic block diagram of the UE of FIG. 9 according to some other embodiments of the present disclosure.

FIG. 6 is a schematic block diagram of a network node 600 according to some embodiments of the present disclosure. Optional features are represented by dashed boxes. The network node 600 may be, for example, a core network node (e.g., a P-GW), a network node that implements a core network function (e.g., an SMF), or a radio access node (e.g., the base station 202 or 206) that implements all or part of the functionality of a network node (e.g., a NG-RAN base station 504, a E-UTRAN base station 506, a MME and/or AMF 510, an SMF, etc.) described herein. As illustrated, the network node 600 includes a control system 602 that includes one or more processors 604 (e.g., Central Processing Units (CPUs), Application Specific Integrated Circuits FIG. 7 is a schematic block diagram that illustrates a virtualized embodiment of the network node 600 according to some embodiments of the present disclosure. This discussion is equally applicable to other types of network nodes. Further, other types of network nodes may have similar virtualized architectures. Again, optional features are represented by dashed boxes.

As used herein, a "virtualized" network node is an implementation of the network node 600 in which at least a portion of the functionality of the network node 600 is implemented as a virtual component(s) (e.g., via a virtual machine(s) executing on a physical processing node(s) in a network(s)). As illustrated, in this example, the network node 600 may include the control system 602 and/or the one or more radio units 610, as described above. The control system 602 may be connected to the radio unit(s) 610 via, for example, an optical cable or the like. The network node 600 includes one or more processing nodes 700 coupled to or included as part of a network(s) 702. If present, the control system 602 or the radio unit(s) 610 are connected to the processing node(s) 700 via the network 702. Each processing node 700 includes one or more processors 704 (e.g., CPUs, ASICs, FPGAs, and/or the like), memory 706, and a network interface 708.

In this example, functions 710 of the network node 600 described herein are implemented at the one or more processing nodes 700 or distributed across the one or more processing nodes 700 and the control system 602 and/or the radio unit(s) 610 in any desired manner. In some particular embodiments, some or all of the functions 710 of the network node 600 described herein are implemented as virtual components executed by one or more virtual machines implemented in a virtual environment(s) hosted by the processing node(s) 700. As will be appreciated by one of ordinary skill in the art, additional signaling or communication between the processing node(s) 700 and the control system 602 is used in order to carry out at least some of the desired functions 710. Notably, in some embodiments, the control system 602 may not be included, in which case the radio unit(s) 610 communicates directly with the processing node(s) 700 via an appropriate network interface(s).

In some embodiments, a computer program including instructions which, when executed by at least one processor, causes the at least one processor to carry out the functionality of network node 600 or a node (e.g., a processing node 700) implementing one or more of the functions 710 of the network node 600 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
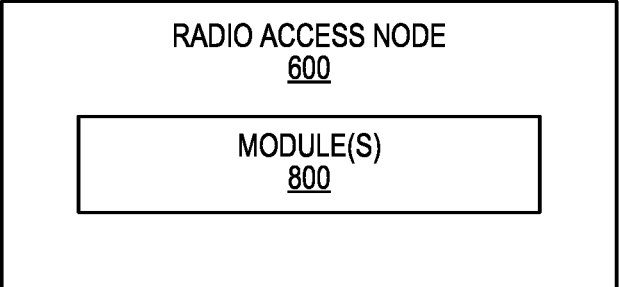
FIG. 8 is a schematic block diagram of the network node of FIG. 6 according to some other embodiments of the present disclosure.

FIG. 8 is a schematic block diagram of the network node 600 according to some other embodiments of the present disclosure. The network node 600 includes one or more modules 800, each of which is implemented in software. The module(s) 800 provide the functionality of the network node 600 described herein (e.g., one or more functions of a NG-RAN base station, a E-UTRAN base station, a MME, an AMF, an SMF, etc. described herein, e.g., with respect to FIG. 5). This discussion is equally applicable to the processing node 700 of FIG. 7 where the modules 800 may be implemented at one of the processing nodes 700 or distributed across multiple processing nodes 700 and/or distributed across the processing node(s) 700 and the control system 602.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
ASIC Application Specific Integrated Circuit
AUSF Authentication Server Function
CP Control Plane
CPU Central Processing Unit
DN Data Network
DSP Digital Signal Processor
eNB Enhanced or Evolved Node B
EPC Evolved Packet Core
ePDG Evolved Packet Data Gateway
EPS Evolved Packet System
E-UTRA Evolved Universal Terrestrial Radio Access
E-UTRAN Evolved Universal Terrestrial Radio Access
    Network
FPGA Field Programmable Gate Array
gNB New Radio Base Station
gNB-DU New Radio Base Station Distributed Unit
HSS Home Subscriber Server
ID Identification or Identity?
IMS Internet Protocol Multimedia Subsystem
IoT Internet of Things
IP Internet Protocol
LTE Long Term Evolution
MME Mobility Management Entity
MTC Machine Type Communication
N3IWF Non-Third Generation Partnership Project Inter-
    working Function
NAS Non-Access Stratum
NEF Network Exposure Function
NF Network Function
ng-eNB Next Generation Enhanced or Evolved Node B
NG-RAN Next Generation Radio Access Network
NR New Radio
NRF Network Function Repository Function
NSSF Network Slice Selection Function
PC Personal Computer
PCF Policy Control Function
PDN Packet Data Network
PDU Protocol Data Unit
P-GW Packet Data Network Gateway
PGW-C Packet Data Network Gateway-Control Plane PGW-C+SMF Packet Data Network Gateway-Control Plane and Session Management Function
QoS Quality of Service
RAM Random Access Memory
RAN Radio Access Network
RAT Radio Access Technology
ROM Read Only Memory
RRH Remote Radio Head
RTT Round Trip Time
SCEF Service Capability Exposure Function
SGW Serving Gateway
SIP Session Initiation Protocol
SMF Session Management Function
TS Technical Specification
UDM Unified Data Management
UE User Equipment
UP User Plane
UPF User Plane Function
VoNR Voice Over New Radio
VoIP Voice Over Internet Protocol
VoWiFi Voice Over WiFi Those skilled in the art will recognize improvements and modifications to the embodiments of the present disclosure. All such improvements and modifications are considered within the scope of the concepts disclosed herein.

What is claimed is:

1. A method performed by a network node for performing handover of a Protocol Data Unit, PDU, Session, the method comprising:

receiving a PDU Session establishment initiation from a User Equipment, UE, for an ongoing voice session over external network access, wherein the ongoing voice session comprises a first Quality of Service, QoS, flow and a second QoS flow;

setting up a PDU Session comprising the first QoS flow from the ongoing voice session for the UE; and initiating a PDU Session modification for the PDU session to set up the second QoS flow from the ongoing voice session for the UE.

2. The method of claim 1, further comprising registering the UE for network access before receiving the PDU Session establishment initiation from the UE.

3. The method of claim 2, further comprising providing the external network access for the ongoing voice session before registering the UE for in-network access.

4. The method of claim 1, wherein initiating the PDU Session modification results in a Radio Access Technology, RAT, fallback for the second QoS flow.

5. The method of claim 1, wherein:

the first QoS flow comprises a Session Initiation Protocol, SIP, QoS flow; and the second QoS flow comprises a Voice over Internet Protocol, VOIP, QoS flow.

6. The method of claim 1, wherein the network node comprises a Session Management Function, SMF.

7. The method of claim 6, wherein setting up the PDU Session comprises:

accepting a PDU session transfer towards the UE; and
requesting to set up only the first QoS flow.

8. The method of claim 7, wherein setting up the PDU Session further comprises releasing resources from an Access Network, AN, for the external network access.

9. The method of claim 7, wherein requesting to set up only the first QoS flow comprises requesting to set up only the first QoS flow based on a local configuration of a Radio Access Network, RAN, serving the UE.

10. The method of claim 7, wherein the first QoS flow is a QoS flow associated with a default QoS rule in the RAN.

11. The method of claim 9, wherein the local configuration of the RAN is restricted to handover from an Evolved Packet Data Gateway, ePDG, to a Fifth Generation, 5G, System, 5GS, or handover from Non-Third Generation Partnership Project, 3GPP, Interworking Function, N3IWF, to 3GPP access in a 5G Core, 5GC.

12. The method of claim 9, wherein the local configuration of the RAN is restricted to roaming cases.

13. The method of claim 1, wherein the network node is a Third Generation Partnership Project, 3GPP, 5G core network node.

14. The method of claim 13, wherein the ongoing voice session is an Internet Protocol Multimedia Subsystem, IMS, voice session over non-3GPP access using an Evolved Packet Data Gateway, ePDG.

15. The method of claim 13, wherein the ongoing voice session is an Internet Protocol Multimedia Subsystem, IMS, voice session over non-3GPP access using a Non-3GPP Interworking Function, N3IWF.

16. The method of claim 13, wherein the network node comprises a Packet Data Gateway, PGW, Control Plane, PGW-C and Session Management Function, SMF, PGW-C+SMF.

17. The method of claim 13, wherein the second QoS flow has a more stringent QoS requirement than the first QoS flow.

18. The method of claim 13, wherein setting up the PDU Session comprises initiating a handover from an ePDG to a 5GS or a handover from a N3IWF to 3GPP access in a 5GC.

19. The method of claim 13, wherein initiating the PDU Session modification results in an Evolved Packet System, EPS, Fallback or an inter-Radio Access Technology, RAT, Fallback for the second QoS flow.

20. A network node configured to communicate with a User Equipment, UE, the network node comprising processing circuitry configured to:

receive a Protocol Data Unit, PDU, Session establishment initiation from a UE for an ongoing voice session over external network access, wherein the ongoing voice session comprises a first Quality of Service, QoS, flow and a second QoS flow;

set up a PDU Session comprising the first QoS flow from the ongoing voice session for the UE; and initiate a PDU Session modification for the PDU session to set up the second QoS flow from the ongoing voice session for the UE.

* * * * *